UNITED STATES PATENT OFFICE.

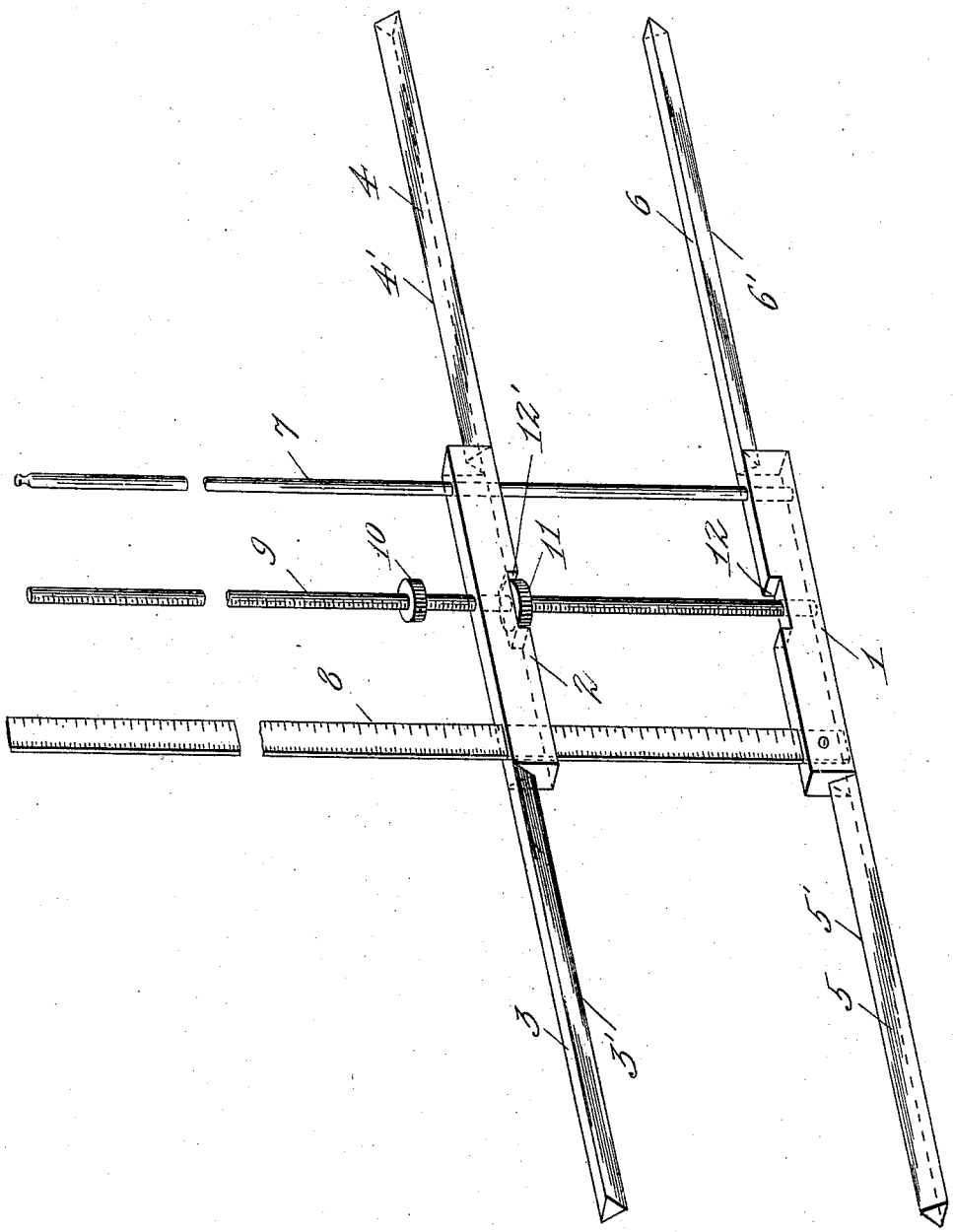

JEAN ARISTIDE PETIT, OF SEATTLE, WASHINGTON.

DOUBLE SELF-REPORTING CALIPERS.

No. 915,473.　　　Specification of Letters Patent.　　Patented March 16, 1909.

Application filed June 28, 1906. Serial No. 323,823.

*To all whom it may concern:*

Be it known that I, JEAN ARISTIDE PETIT, heretofore a citizen of the French Republic, but having declared my intention to become a citizen of the United States, residing at Seattle, in the county of King and State of Washington, have invented a new and useful Improvement in Double Self-Reporting Calipers, of which the following is a specification, reference being had to the accompanying drawings as constituting a part thereof.

My invention relates to that class of instruments commonly called calipers, and it has for its object to obtain a simple inexpensive, practical, working instrument by which accurate measurements may be taken of the thickness or diameter of a flat, circular or spherical object, and when such thickness or diameter has been ascertained, the instrument shall then be set to give the accurate measurement of the cavity or eye in which such other flat, circular or spherical object may be received or inserted. When I use the term measurement, I merely mean in the sense of indicating the exact size required to make one piece fit another.

Furthermore, it is my object to so contrive my caliper that the measuring surfaces thereof may be finished by convenient and reliable methods, so as to obtain absolutely accurate and correct surfaces, for the purposes set forth; also to facilitate the measuring work to be done.

To this end my invention comprises the arrangement of the parts shown in the drawing above referred to, in which the figure shown represents a perspective elevation of my improved caliper.

Referring now to the numerals as designating the parts described: My caliper comprises parallel bars 1, 2, the lower of such bars being provided with two right-angle, rigid arms 7, 8, on which arms the bar 2 is slidably held. The arms 7, 8, may be of any convenient construction. As shown in the drawing, the arm 7 represents a circular rod, while the arm 8 is of rectangular cross section and is provided with measuring graduations or marks. In the arm 1, is fastened the lower end of a threaded rod 9, which rod extends through a perforation therefor made in the bar 2; and below and above the bar 2 there are provided, on said rod 9, lock-nuts 10, 11. I prefer to make the inner opposite faces of the bars 1, 2, with cavities 12, 12', in which to receive the lock-nut 11, so as to admit of the bars 1, 2, being brought into close contact with each other.

Projecting laterally from the bars 1, 2, are straight arms or members 3, 5, provided for taking the exterior measurements of a flat, circular or spherical object; and such members 3, 5, are made with beveled inner faces, so as to provide knife-edges 3', 5'. On the opposite ends of the bars 1, 2, are provided straight corresponding measuring arms or members 4, 6, by which to take the interior measurements of the cavity or eye, in which the flat, circular or spherical object is to be inserted. These arms are arranged in reverse relation, with respect to the arms 3, 5, as will be observed and are provided with knife-edges 4', 6', the alinement of which knife-edges 4', 6' is an exact continuation of the horizontal alinement of the corresponding exterior knife or measuring edges 3', 5', of the members 3, 5. It is apparent that the accurate alinement of the knife-edges 3', 4', 5', 6', for making the exterior and interior measurements of the objects, may be readily obtained by the use of well known and convenient machines or mechanical contrivances, and thus it becomes an inexpensive matter to construct a caliper of the design described by me and by which the measurements taken are absolutely reliable.

It is to be noted that the measuring members are made of considerable length so as to facilitate the taking of accurate measurements of some length or depth, circumferential or interior. My caliper is, however, equally well adapted to take measurements of small work.

To illustrate the use of my caliper, I will give the example of using the same in boring a pulley to be placed on a shaft of a given size. The lock-nuts 10, 11 are loosened to permit the moving of the bar 2 toward and from the bar 1, until the knife-edges 3', 5' of the arms 3, 5 will just pass over the shaft; thereupon the lock-nuts are adjusted to lock the bar 2 rigidly in place; and this being done, the straight, long knife-edges 4', 6' of the members 4, 6 have been accurately positioned to give the required measurements of the eye to be made in the pulley in order to accurately fit its shaft.

My caliper is especially adapted, as is apparent, to take accurate measurements of deep cavities or holes, which work cannot be accurately done, with facility, by the instruments heretofore in use. To illustrate: When boring with a long boring tool, in a lathe, the tool is apt to bend a trifle, and thus make an untrue bore. The workman, however, cannot discover this fact except by repeated measurements. By using my caliper, however, accurate measurements may be instantly taken along the entire wall-surface of the cavity; and if there are any protruding or uneven places, caused by the bending of the tool, the caliper points or members 4, 6 will not pass the same, and thus instantly indicate the defect and locate the exact place where the defect exists. The described construction of my caliper also renders the same especially adapted to take measurements of spherical objects. The graduations on the arm 8 are not essential for my caliper is designed to be used more as a working than a measuring tool.

I claim:

1. A caliper comprising two parallel bars, right-angle rigid guide-members on the lower bar, on which guide-members the other bar is adjustably movable, means for locking the movable bar in place, rigid laterally extending straight-faced measuring-members at the opposite ends of each bar, the measuring-members at one end of the bars being made with knife-edged inner faces, and the measuring-members at the opposite ends of the bars being made with knife-edged outer faces, horizontally alined relatively to said knife-edged inner faces.

2. A caliper comprising two parallel bars, right-angle rigid guide-members on the lower bar, on which guide-members the other bar is adjustably movable, one of said guide-members being square in cross section, means for locking the movable bar in place, rigid laterally extending straight-faced measuring-members at the opposite ends of each bar, the measuring-members at one end of the bars being made with knife-edged inner faces, and the measuring-members at the opposite ends of the bars being made with knife-edged outer faces, horizontally alined relatively to said knife-edged inner faces.

3. A caliper comprising two parallel bars, three right-angle guide-members rigid on the lower bar, the center guide-member having a thread, and one of the outer guide-members being made square in cross section, the upper bar being adjustable on said guide-member, lock-nuts on the threaded guide-member and adjustable against the upper and lower faces of the movable bar, the inner faces of both bars being made with opposite cavities so as to receive the lock-nut on said threaded guide-member between the bars, and thus allow said bars to be brought in contact, rigid laterally extending straight-faced measuring-members at the opposite ends of each bar, the measuring-members at one end of the bars being made with knife-edged inner faces, and the measuring-members at the opposite ends of the bars being made with knife-edged outer faces, horizontally alined relatively to said knife-edged inner faces.

Seattle the twenty June 1906.

JEAN ARISTIDE PETIT.

Witnesses:
CHRIST C. BERG,
EDWARD O'NEILL.